(12) United States Patent
Parker et al.

(10) Patent No.: US 7,316,029 B1
(45) Date of Patent: Jan. 1, 2008

(54) NETWORK SECURITY SERVICES ARCHITECTURE

(75) Inventors: Benjamin J. Parker, Overland Park, KS (US); Shane W. Werner, Olathe, KS (US); Charles Diaz, Overland Park, KS (US); Terry M. Frederick, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1163 days.

(21) Appl. No.: 10/003,816

(22) Filed: Oct. 25, 2001

(51) Int. Cl.
*H04L 29/00* (2006.01)

(52) U.S. Cl. .................. 726/13; 726/1; 726/2; 726/14; 726/26; 726/27; 726/28; 370/428

(58) Field of Classification Search ............... 713/201, 713/156; 709/223–225, 246; 726/28, 1, 726/2, 13, 14; 370/428
See application file for complete search history.

(56) References Cited

U.S. PATENT DOCUMENTS

| | | | | |
|---|---|---|---|---|
| 5,822,435 A | * | 10/1998 | Boebert et al. | 713/192 |
| 5,845,091 A | * | 12/1998 | Dunne et al. | 709/240 |
| 5,848,233 A | * | 12/1998 | Radia et al. | 726/13 |
| 5,889,958 A | * | 3/1999 | Willens | 709/229 |
| 5,968,176 A | * | 10/1999 | Nessett et al. | 726/11 |
| 5,987,611 A | * | 11/1999 | Freund | 726/4 |
| 6,145,002 A | * | 11/2000 | Srinivasan | 709/225 |
| 6,178,505 B1 | * | 1/2001 | Schneider et al. | 713/168 |
| 6,230,271 B1 | * | 5/2001 | Wadlow et al. | 726/1 |
| 6,393,481 B1 | * | 5/2002 | Deo et al. | 709/224 |
| 6,823,462 B1 | * | 11/2004 | Cheng et al. | 726/15 |
| 6,832,321 B1 | * | 12/2004 | Barrett | 726/11 |
| 6,853,988 B1 | * | 2/2005 | Dickinson et al. | 705/75 |
| 6,954,790 B2 | * | 10/2005 | Forslow | 709/227 |
| 7,176,791 B2 | * | 2/2007 | Sakaki et al. | 340/502 |
| 7,203,190 B1 | * | 4/2007 | Ruban et al. | 370/356 |
| 2003/0072318 A1 | * | 4/2003 | Lam et al. | 370/428 |

OTHER PUBLICATIONS

OPSEC *Check Point FireWall-1, Version 1.01*; Nov. 1998.
Log-On Data *X-Stop ES2000*.
Trend Micro *InterScan3 Virus protection and email management for the Internet gateway*; 2001.
Cisco Systems *Cisco 6400 Carrier-Class Broadband Aggregator Data Sheet*; 2000.

\* cited by examiner

*Primary Examiner*—Nasser Moazzami
*Assistant Examiner*—Carl Colin (57) ABSTRACT

A convenient and low cost computer security system deploys a menu of security tools within a local network that can be selected by a user connected to the network. A network architecture of the invention is structured to provide highly effective and flexible security features while greatly simplifying the user experience. Separate security service pathways provide different combinations of security service features and traffic from each user is directed to a pathway providing the desired features.

20 Claims, 6 Drawing Sheets

SERVICES TABLE

| SERVICE ID | SERVICE DESCRIPTION | SERVICE CATEGORY | BILLING TYPE | BILLING RATE | HIERARCHY BITMAP | REQUIRED SECURITY LEVEL |
|---|---|---|---|---|---|---|
| ... | ... | ... | ... | ... | ... | ... |
| ... | ... | ... | ... | ... | ... | ... |
| ... | ... | ... | ... | ... | ... | ... |

Fig. 5

USERS TABLE

| EXTERNAL USER ID | PAYMENT ID | USER NAME | USER ID | USER PASSWORD | E-MAIL ADDRESS | USER SECURITY LEVEL |
|---|---|---|---|---|---|---|
| ... | ... | ... | ... | ... | ... | ... |
| ... | ... | ... | ... | ... | ... | ... |
| ... | ... | ... | ... | ... | ... | ... |

Fig. 6

| SUBSCRIPTIONS TABLE | | | | | | | | |
|---|---|---|---|---|---|---|---|---|
| SUBSCR. ID | SERVICE ID | USER ID | PAYMENT TYPE | PAYMENT ID | TIME STARTED | TIME STOPPED | TIME OF LAST PAYMENT | TIME SUBSCR. EXPIRES |
| ... | ... | ... | ... | ... | ... | ... | ... | ... |
| ... | ... | ... | ... | ... | ... | ... | ... | ... |
| ... | ... | ... | ... | ... | ... | ... | ... | ... |

Fig. 7

NETWORK SECURITY SERVICES ARCHITECTURE

BACKGROUND OF THE INVENTION

The present invention relates in general to an architecture for providing computer security for users connected to a network that is internetworked, and, more specifically, to security features such as firewall, content filtering, and/or virus scanning at a network level.

Much attention has been directed to computer internetworking problems of hacking, virus attacks, availability of unsuitable content, and other security issues. As each type of problem has developed, protective security tools have arisen to allow computers to be protected from attacks and to supervise how the computers can interact with the internetwork.

Firewalls block certain types of information from passing through the firewall. Blocking of particular packets within user traffic directed through the firewall can be performed based on several different criteria, such as IP address where the traffic originated, domain names of the source or destination of the traffic, the protocol in which the traffic is formatted, and the port sending or receiving the traffic, among others. Firewalls can also perform proxy services or perform network address translation (NAT) so that a particular computer is not directly accessible from outside the firewall.

Content filtering allows an authority, such as a parent or business manager, to exercise control over the information or content that can be accessed using the network. A content filter can be set up to prohibit access to particular network locations (e.g., websites) and/or to filter out data packets that contain predefined objectionable words or terms, for example. Besides allowing the authority to customize lists of prohibited sites or services and to specify content labels of material to be blocked, many content filtering systems also allow the authority to monitor other aspects of a user's networking activities, such as the amount of time a user (e.g., child) spends browsing an internetwork or even their own network.

Virus scanning tools compare packet data or file information to known virus patterns in order to detect the presence of a virus and to take steps to alert the user and remove the virus. As new viruses appear, virus scanning software must be updated with new virus patterns so that new viruses do not go undetected.

Thus, individual users of computer networks have tools at their disposal if they want to reduce these threats. These tools are typically implemented in software on a user's individual computer or by using hardware connected to the user's computer. However, the robustness of security protections that can be achieved by individual users is usually limited, and the cost and inconvenience of fully implementing protective measures have discouraged their widespread use. Thus, many users of computer networks remain vulnerable to compromises in security. The seriousness of these threats is further increased as more users acquire "always on" broadband network connections since opportunities for unauthorized access are lengthened.

SUMMARY OF THE INVENTION

Among its many advantages, the present invention achieves a convenient and low cost computer security system by deploying a menu of security tools within a local network that can be selected by a user connected to the network. A network architecture of the invention is structured to provide highly effective and flexible security features while greatly simplifying the user experience.

In one aspect of the invention, a private network apparatus for connecting a user to an external internet comprises a plurality of security service pathways each providing a respective combination of security service features. A service selection dashboard allows the user to select from a plurality of security service features for user traffic to and from the user. A network management server is coupled to the service selection dashboard for storing a subscriber configuration in response to the user selected security service features. A pass-through router is coupled to the external internet. A service selection gateway is coupled to the user for directing the user traffic to and from one of the service selection dashboard, the pass-through router, or one of the security service pathways. A security service router couples the plurality of security service pathways to the external internet. The service selection gateway directs user traffic to the service selection dashboard if the subscriber configuration is in an initialized state. The service selection gateway directs user traffic to a respective one of the security service pathways or to the pass-through router in response to the subscriber configuration after initialization by the service selection dashboard.

DETAILED DESCRIPTION OF PREFERRED EMBODIMENTS

Figure 1:
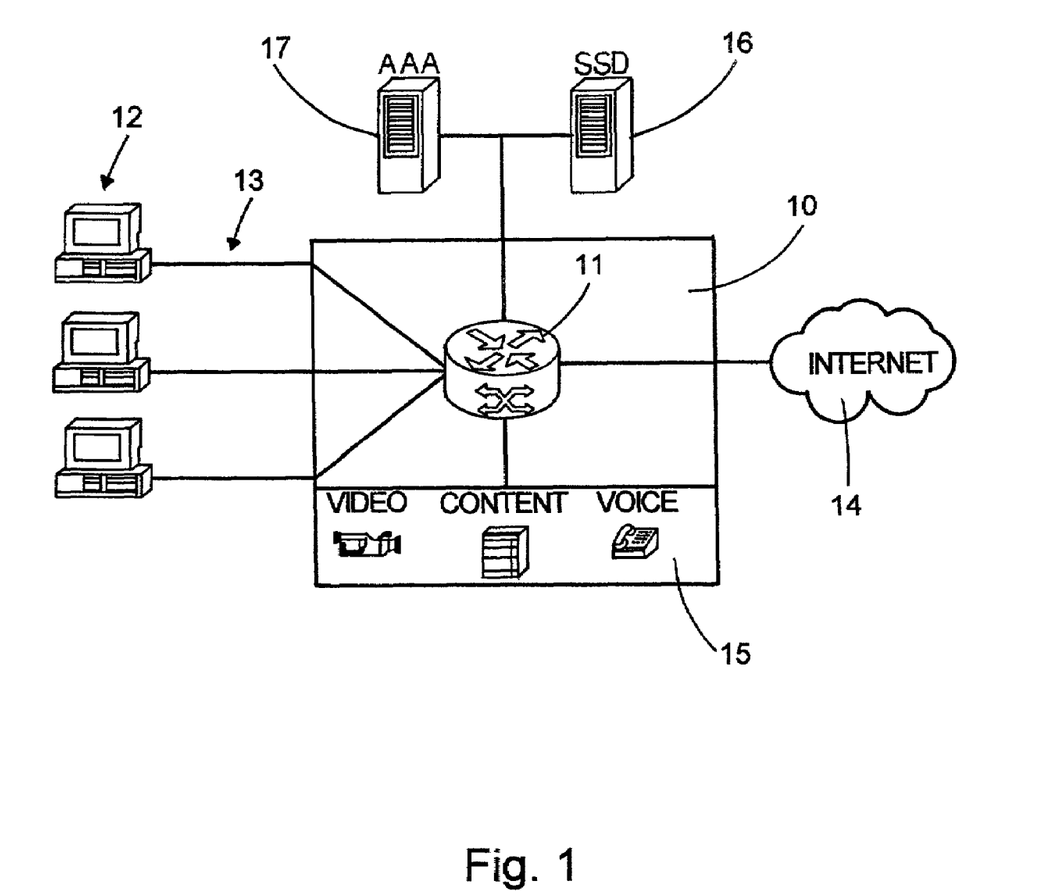
FIG. 1 is a block diagram showing a subscription services network architecture for an internet services provider.

Referring to FIG. 1, a known system architecture for a network service provider is partially shown. One example of a commercially available service of this type is the Integrated On-Demand Network (ION) operated by Sprint Communications.

The local network of the service provider includes a number of hubs or gateways, such as gateway 10 in FIG. 1. Each hub includes a concentrator or aggregator 11 which is connected to a plurality of remote users 12 (e.g., residential or business users) via a plurality of connections 13. The connections can be dial-up, digital-subscriber line (DSL), cable modem, fiber optic, wireless, or a combination of these or others. Each remote user communicates point-to-point or bridged with concentrator 11, and concentrator 11 routes the aggregated user traffic to other destinations in the local network or to an external network, such as the Internet 14. Concentrator 11 may for example be comprised of a Cisco 6400 Carrier-Class Broadband Aggregator.

Concentrator 11 either itself or in combination with other hardware components functions as a service selection gateway (SSG) which allows users to subscribe to various on-demand network services. These subscription services may include a walled garden 15 having various content servers, video on-demand servers, and voice services, for example. The service selection gateway works together with a service selection dashboard (SSD) 16 and an authentication, authorization, and accounting (AAA) server 17. SSD 16 functions as an http-based portal for a user to make service selections. Information identifying the selected services (including configuration and billing information) is stored by AAA server 17. When attempted access to subscription services are made by a user, concentrator 11 consults AAA server 17 to determine whether to connect the user with the desired service.

The present invention provides computer network security services on a subscription basis. In particular, the security service features may include firewall protection, content filtering, virus scanning, or a combination of them simultaneously. By providing these features as a network service, the users are relieved of the burden of selecting, installing, configuring, and maintaining software for performing these functions. The present invention provides a network architecture that facilitates the provisioning of these features in a highly efficient manner so that the features can be provided to the user at a lower cost than would be the case for user installations.

Figure 2:
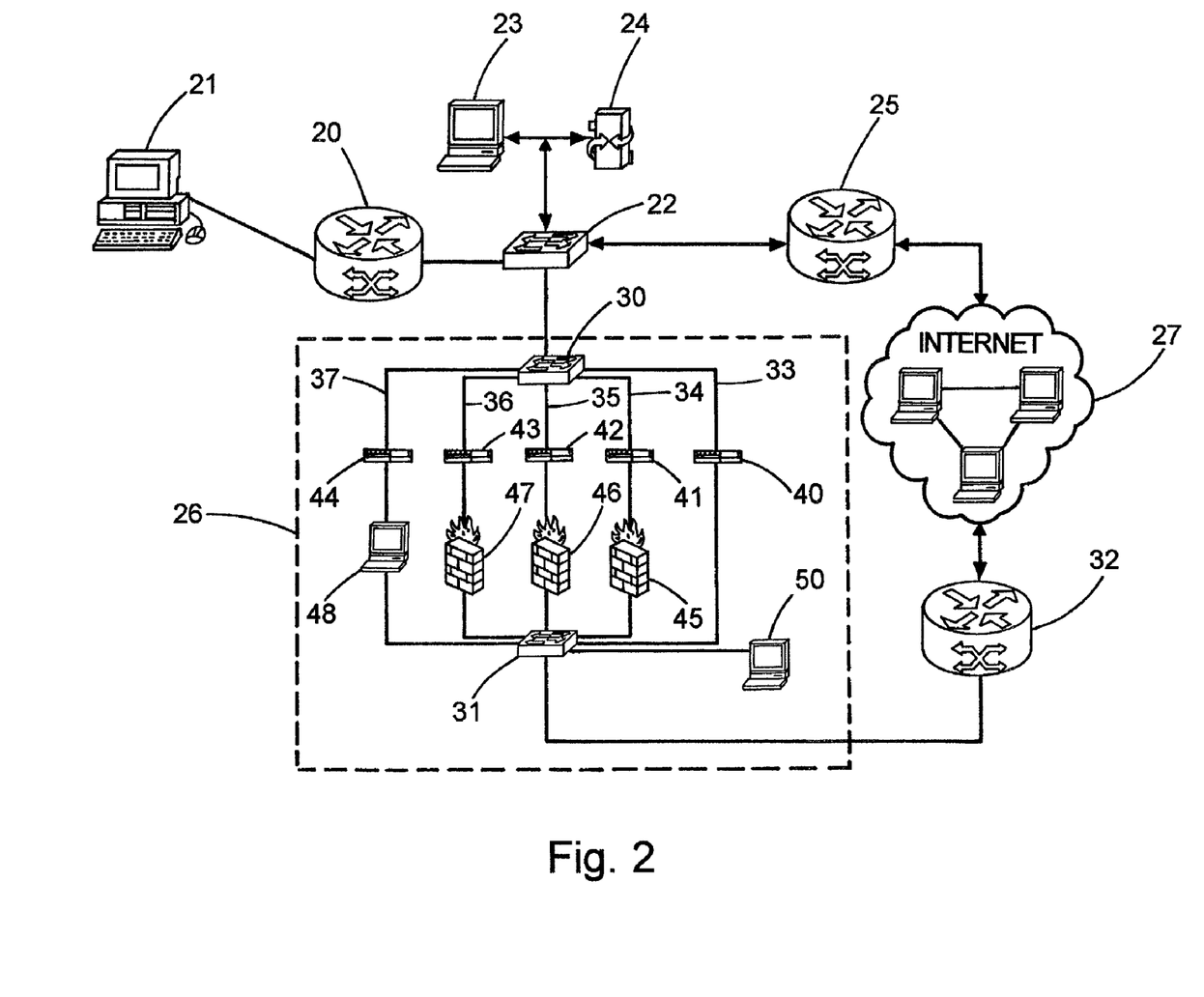
FIG. 2 is a block diagram showing the network architecture of the present invention including a plurality of security service pathways.

Referring to FIG. 2, a concentrator 20 (including a service selection gateway) is coupled to a user 21. Concentrator 20 is also connected to a switch 22 for communicating with a service selection dashboard (SSD) 23, an AAA server 24, a pass-through router 25, and a security services substructure 26. Switch 22 may be comprised of a Catalyst 6509 ethernet switch from Cisco Systems, for example.

When a user connects to the SSG, concentrator 20 communicates with AAA server 24 to retrieve a corresponding user profile if one exists for the user. If a user profile does not yet exist, then the user is re-directed to SSD 23 and is presented with web pages providing subscription choices. As described in more detail below, a profile is then saved and subsequent traffic from/to the user is directed accordingly. In this embodiment AAA server 24 includes a remote authentication dial-in user service (RADIUS) having a database of user profiles.

For a user that has not selected any security service features, any external (i.e., internet) traffic is routed through switch 22 and pass-through router 25 to and from an internet 27. Pass-through router 25 may be comprised of a giga switch router such as a Cisco 12000 Series Internet Router, for example.

For provisioning security service features, security services substructure 26 is comprised of a plurality of security service pathways each providing a respective combination of security service features. The features include three grades of firewall protection, customizable content filtering, and virus scanning. The several security service pathways are connected between a user-side ethernet switch 30 and an internet-side ethernet switch 31. Switches 30 and 31 demultiplex traffic from separate users for processing by corresponding security service pathways and then re-multiplex the traffic for normal handling by the remainder of the network. Ethernet switch 31 is connected to a security service router 32, which may be comprised of a giga switch router such as a Cisco 12000 Series Internet Router, for example.

The security service pathways in this preferred embodiment include pathways 33-37. Pathway 33 includes a content filter unit 40. Pathway 33 is used for users that subscribe only to content filtering. Content filter unit 40 may be comprised of an X-Stop™ R2000 available from Log-On Data Corporation. Unit 40 is a content manager that filters HTTP, FTP, NNTP, and SNMP streams (e.g., websites, chat, newsgroups, file transfers) for inappropriate keywords or blocked addresses, for example. An administrator (e.g., parent or supervisor) for any group of users can configure or reconfigure content filter selections such as keywords, forbidden internet addresses, and allowed access times for individual users in the group. When unit 40 detects a connection to a blocked address, for example, a "blocked content" message is sent to the user and a reset packet is sent to the destination web server to terminate the connection.

Predefined filtering categories can be provided for selection by the user, such as alcohol, anarchy, criminal skills, cults, drugs, gambling, etc. Each user within a group can also be labeled according to age (e.g., child, pre-teen, teen, young adult) with a default subset of filtering categories being blocked for each label.

Preferably, content filtering unit 40 creates a log file in which it stores summary information each time that content is blocked. The logs are retrievable by the administrator.

Pathways 34-36 each include a respective content filter unit 41-44 and a respective firewall unit 45-47. These pathways handle traffic for subscribers of firewall features and content filtering features. To reduce overall equipment investment and provide very cost effective security service features, subscribing to content filtering may preferably be a prerequisite to obtaining firewall protection. Alternatively, separate pathways containing a firewall but no content filter could be deployed or a content filter could be configured so that it did not block any content.

Firewall units 45-47 may be comprised of Netra™ t1125 servers available from Sun Microsystems running FireWall-1® software available from Check Point Software Technologies, Ltd., for example. All firewall units preferably perform network address translation (NAT) so that the real IP address of the user is not visible from outside the firewalls, thereby preventing unauthorized access to a user's computer by outside hackers, for example.

Three grades of firewall protection are provided by pathways 34, 35, and 36, respectively, so that users can obtain the specific firewall capabilities that they desire. Furthermore, the firewall features are instantly reconfigurable to allow for special actions or changes in the firewall characteristics (e.g., turning a firewall off for an interactive gaming session).

The graded firewall protection includes a Low level provided by firewall unit 45 in which predetermined ports are blocked for outgoing traffic. This provides protection against general probing and peer-to-peer hacking in which an outside hacker attempts to retrieve data through the predetermined ports. The predetermined ports would preferably include FTP-data (port 20), Telnet (port 23), and SMTP (port 25), for example. The Low level firewall protection gives some protection while still enabling use of video, audio, and/or data conferencing (e.g., using the H.323 protocol).

A Medium protection level is provided by firewall unit 46 in pathway 35. The Medium level is the same as the Low level except that incoming traffic to the predetermined ports is also blocked.

A High protection level is provided by firewall unit 47 in pathway 36. The High level includes all blocking of the Medium level plus the blockage of all incoming traffic that was not initiated by a request from the user.

Each firewall unit 45-47 maintains a log of all traffic destined for the user's ip address that was stopped at the firewall. The subscriber can choose to have log files e-mailed to them periodically or the log files can be retrievable from a predetermined location in the local area network.

Pathway 37 includes a virus scanning unit 48, whereby pathway 37 handles traffic for users that select content filtering and virus scanning but not the firewall feature. Virus scanning unit 48 inspects HTTP, FTP, SMTP, HTTPS, Active X, and Java traffic streams for virus patterns. When a virus pattern is detected, the offending packet is either dropped or cleaned of the virus. Unit 48 may be comprised of a Netra™ t1125 server running InterScan™ VirusWall™ software from Trend Micro Incorporated.

Virus scanning unit 48 is contained within pathway 37 with all traffic in pathway 37 routed directly through it. This configuration provides straightforward virus scanning in the absence of a firewall.

To support the remaining combinations of security service features, a virus scanning unit 50 is coupled to ethernet switch 31 for performing virus scanning for pathways 34, 35, and 36 containing the firewalls. Unit 50 may be comprised of the same hardware and software as unit 48, but unit 50 operates in a content vectoring protocol (CVP) mode. In that mode, unit 50 operates as a CVP server which collects incoming traffic moving to multiple firewalls before the traffic reaches the firewalls. Only that traffic for a user subscribed to virus scanning is collected and scanned.

Figure 3:
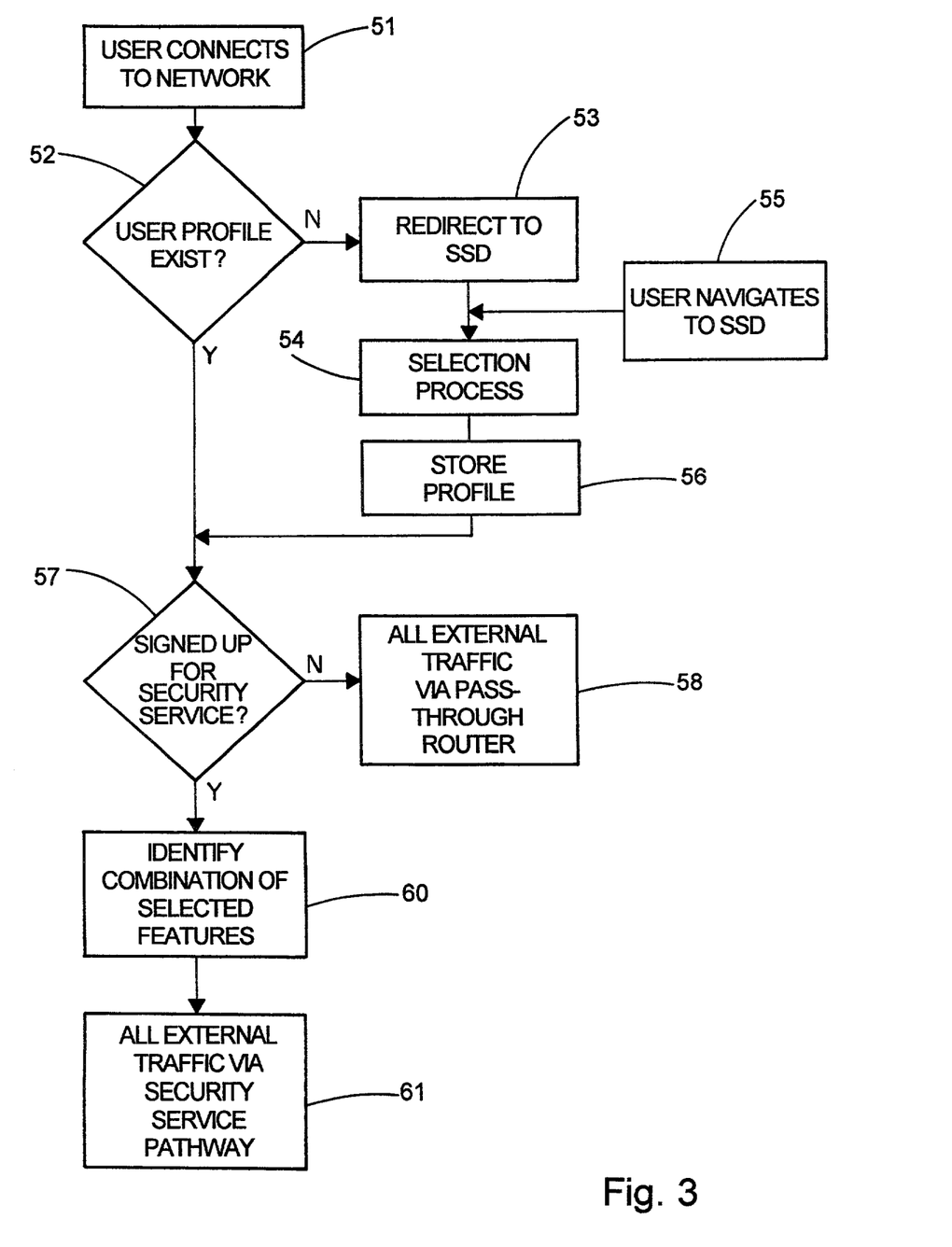
FIG. 3 is a flowchart showing an overall method of the present invention for providing security services.

Referring now to FIG. 3, a preferred method of network operation for providing subscription access to security service features begins when a user connects to the network in step 51. In step 52, the SSG checks to determine whether a user profile exists for the user that has signed on. If no profile is currently stored in the network (e.g., in the RADIUS server), then the user is redirected to the SSD in step 53.

In a selection process 54, the user navigates through the SSD and enters all the selection, configuration, and billing information needed in order to activate any selected features. In order to re-select or reconfigure any features, a user can also navigate or link to the SSD in step 55 at any time after the initial setup process.

Figure 4:
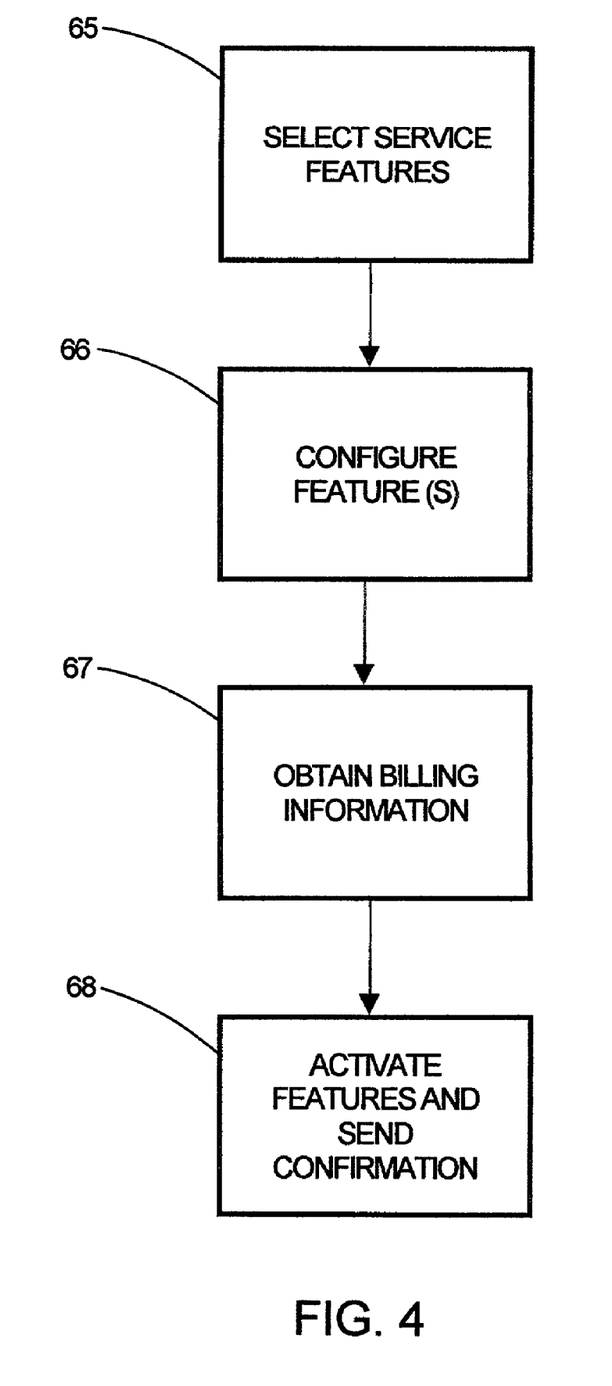
FIG. 4 is a flowchart showing a sign-up process for security service features.

The selection process is shown in more detail in FIG. 4. After being redirected to the SSD, the user would enter a login ID and password, after which the SSD presents a menu of subscription services available to the user. In step 65, the user selects the features desired (e.g., using a point and click interface). For any customizable settings, the features are configured in step 66. The cost, if any, of the subscribed services is displayed to the user at time of selection and billing information (e.g., credit card information) is obtained in step 67. In step 68, the selected features are activated (e.g., by performing a redirect of the user to the selected service features) and an e-mail confirmation of the subscription is sent to the user.

Returning to FIG. 3, a user profile is stored in step 56 based on the selections and configurations from step 54. This profile may preferably be stored in the RADIUS server. The SSD subscription thus concludes and the method proceeds to step 57.

If a user profile was found to exist in step 52, or after the subscription process in step 56, the SSG determines whether the user has subscribed to any security service features in step 57. If no security features are activated, then all external traffic to or from the user are routed through the pass-through router in step 58. If some security features have been subscribed, then the combination of selected features is identified in step 60. In step 61, all subsequent external traffic to or from the user is routed through the corresponding security service pathway and the pathway is configured as required for the user (e.g., content filter keywords and other settings).

In a preferred embodiment, the RADIUS server stores user profiles in a database that also includes information about the various service features. The database may include a Services Table, a Users Table, and a Subscriptions Table, for example.

Figure 5:
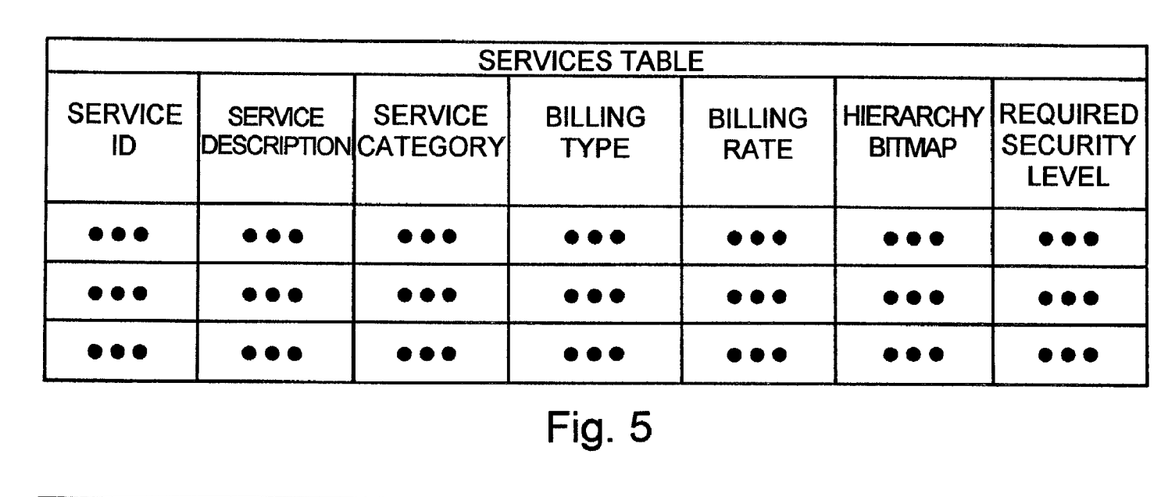
FIGS. 5-7 are tables showing a preferred embodiment for storing user profiles.

A Services Table is shown in FIG. 5 for describing the service features to which a user can subscribe. Each table entry for a security service feature includes a Service ID and a Service Description. The Services Table identifies any hierarchical relationships between the services (e.g., the user may need to subscribe to the firewall feature before being able to subscribe to virus scanning) by means of a hierarchy bitmap. A "required security level" field indicates a security level so that a hierarchical relationship for user access can be built. For example the content filtering may only be changed by an administrator (i.e., a "Master" account). The services may also be organized into categories as indicated by a Services Category field. Categories can be used to limit access of certain customers to only certain categories of services. A billing type and billing rate are included so that the information can be shown to the user during the signup process.

Figure 6:
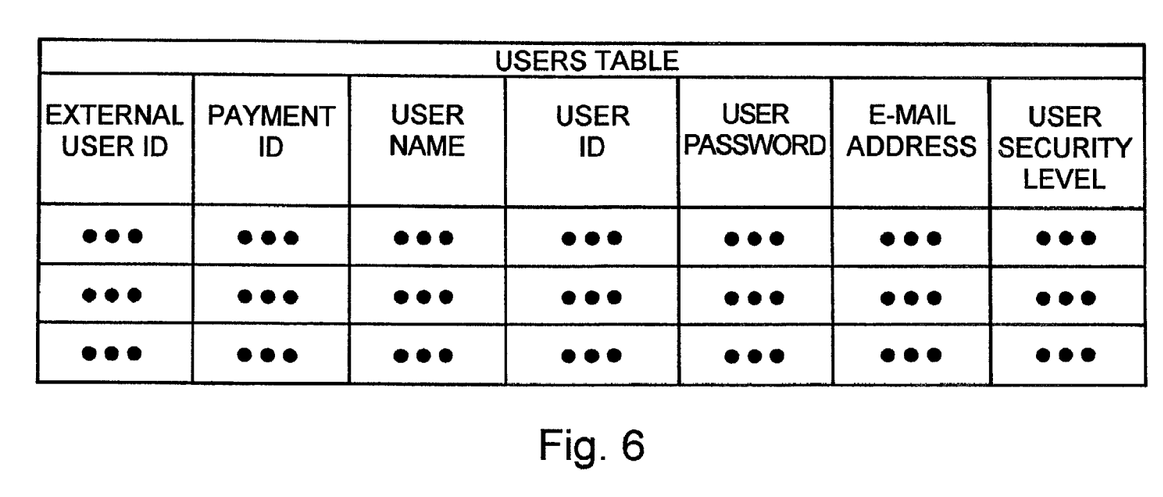

The Users Table is shown in FIG. 6 which stores the user's ID and the user's password. Each user has a unique external user ID that will be used to link to the actual subscriptions in the subscription table. Along with the identifying information, the Users Table stores payment identification. The Users Table also contains a User Security Level to indicate the user's access level. There may also be a link to the "Master" account ID to indicate a hierarchical relationship to another user. If not a Master account ID, the Users Table may also contain an indicator to block all changes by this user.

Figure 7:
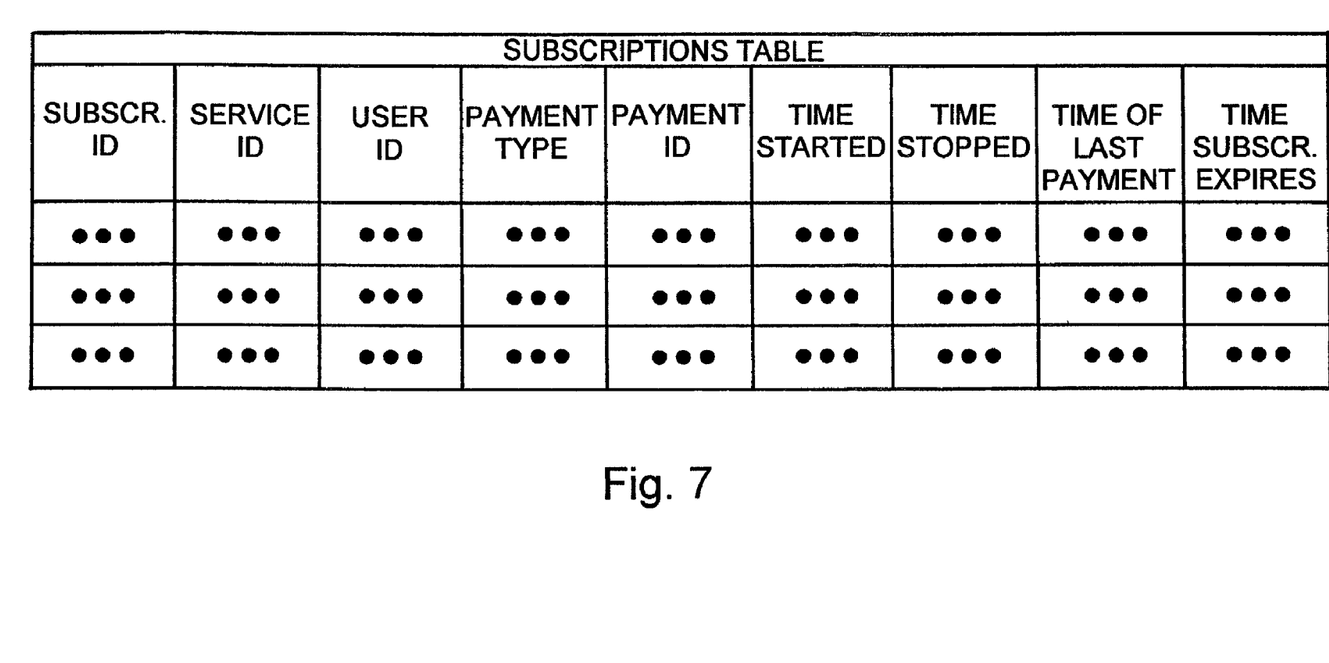

The Subscriptions Table as shown in FIG. 7 contains a subscription ID, a service ID of the service subscribed to, and a user ID of the user that is subscribing. The Subscriptions Table contains a payment type and a payment ID pointer (e.g., to a credit card entry). The Subscriptions Table also contains any time-specific data such as time the subscription started, time the subscription stopped, last time a payment was made on this subscription, time the subscription will expire, and so on.

Whenever a user changes their subscription, the Subscriptions Table will be changed, the RADIUS database will be updated, and a subscriptions log record generated. The log record will contain the time of the change and what was changed. The Subscriptions Table will also be downloaded into the RADIUS database on a batch basis (e.g., once per day) to capture any bulk automated changes.

What is claimed is:

1. Private network apparatus for connecting a user to an external internet comprising:

a plurality of security service pathways each providing a respective combination of security service features;

a service selection dashboard allowing said user to select from a plurality of security service features for user traffic to and from said user;

a network management server coupled to said service selection dashboard for storing a subscriber configuration in response to said user selected security service features;

a pass-through router for coupling said user traffic to said external internet independently of said security service pathways;

a service selection gateway coupled to said user for directing said user traffic to and from one of said service selection dashboard, said pass-through router, or one of said security service pathways; and a security service router for coupling said plurality of security service pathways to said external internet;

wherein said service selection gateway directs said user traffic to said service selection dashboard if said subscriber configuration is in an initialized state; and wherein said service selection gateway directs said user traffic to a respective one of said security service pathways or to said pass-through router in response to said subscriber configuration after initialization by said service selection dashboard.

2. The apparatus of claim 1 wherein said security service pathways include at least one pathway having a firewall.

3. The apparatus of claim 1 wherein said security service pathways include at least one pathway having a virus scanner.

4. The apparatus of claim 1 wherein said security service pathways include at least one pathway having a content filter.

5. The apparatus of claim 1 wherein said security service pathways include at least one pathway having a firewall and a content filter.

6. The apparatus of claim 1 wherein said security service pathways include at least one pathway having a firewall and a virus scanner.

7. The apparatus of claim 1 wherein said security service pathways include at least one pathway having a content filter and a virus scanner.

8. The apparatus of claim 1 wherein said security service pathways include at least one pathway having a firewall, a content filter, and a virus scanner.

9. The apparatus of claim 1 wherein said security service pathways include at least two pathways having firewalls, said firewalls respectively providing different grades of firewall protection.

10. The apparatus of claim 9 comprising three security service pathways each including a respective firewall, said firewalls including a first firewall providing a high grade firewall protection, a second firewall providing a medium grade firewall protection, and a third firewall providing a low grade firewall protection.

11. The apparatus of claim 10 wherein said low grade firewall protection comprises port blocking for outgoing traffic.

12. The apparatus of claim 10 wherein said medium grade firewall protection comprises port blocking for incoming and outgoing traffic.

13. The apparatus of claim 10 wherein said high grade firewall protection comprises port blocking for outgoing traffic and blocking of all incoming traffic not initiated by said user.

14. The apparatus of claim 1 further comprising:

a user-side switch coupling said service selection gateway to said security service pathways; and an internet-side switch coupling said security service pathways to said security service router.

15. A method of providing security service in a network interface to an external internet, said method comprising the steps of:

directing a user to a captive portal;

presenting security service features to said user;

storing a subscription profile for said user in response to security service features selected by said user through said captive portal;

receiving user traffic from said user destined for said external internet at a service selection gateway;

determining from said subscription profile which security service features to apply to said user traffic;

if said subscription profile for said user includes any security service features, then re-directing said user traffic to a particular security service pathway of a plurality of security service pathways, said particular security service pathway corresponding to said security service features identified by said user profile; and if said subscription profile for said user includes no security service features, then re-directing said user traffic to a pass-through router for coupling said user traffic to said external internet.

16. The method of claim 15 wherein said security service features include firewall services, content filtering services, and virus scanning services, and wherein each of said security service pathways corresponds to a combination of said security service features.

17. The method of claim 16 wherein said firewall services comprise selectable grades of firewall protection including a high grade firewall protection, a medium grade firewall protection, and a low grade firewall protection.

18. The method of claim 17 wherein said low grade firewall protection comprises port blocking for outgoing user traffic.

19. The method of claim 17 wherein said medium grade firewall protection comprises port blocking for incoming and outgoing user traffic.

20. The method of claim 17 wherein said high grade firewall protection comprises port blocking for outgoing user traffic and blocking of all incoming traffic not initiated by said user.

* * * * *